United States Patent [19]

Lind

[11] 4,173,508

[45] * Nov. 6, 1979

[54] APPARATUS FOR HANDLING GLASS JARS

[75] Inventor: Robert B. Lind, Oakland, Calif.

[73] Assignee: Gerber Products Company, Fremont, Mich.

[ * ] Notice: The portion of the term of this patent subsequent to Mar. 7, 1995, has been disclaimed.

[21] Appl. No.: 873,756

[22] Filed: Jan. 30, 1978

Related U.S. Application Data

[63] Continuation of Ser. No. 589,159, Jun. 23, 1975, Pat. No. 4,077,826, which is a continuation of Ser. No. 166,885, Jul. 28, 1971, abandoned.

[51] Int. Cl.[2] .......................... B65C 3/06; B32B 17/06; B65B 21/04

[52] U.S. Cl. .................................... 156/499; 156/350; 156/539

[58] Field of Search ............... 156/499, 538, 539, 556, 156/566, 322, 321, 350, 297; 134/63, 68, 72, 131, 152, 171, 57 R, 107, 108, 133; 118/64, 300, 315, 324, 73, 602; 65/60 R; 193/11; 198/455, 747; 214/8.5 F, 309, 310

[56] References Cited

U.S. PATENT DOCUMENTS

| | | | |
|---|---|---|---|
| 2,159,993 | 5/1939 | Krueger | 156/321 |
| 2,369,737 | 2/1945 | Jackson et al. | 118/326 |
| 2,435,267 | 2/1948 | Cahn | 156/321 |
| 2,744,531 | 5/1956 | Martin et al. | 134/131 X |
| 2,763,575 | 9/1956 | Bede | 427/422 |
| 2,853,048 | 9/1958 | Whitbeck | 118/314 |
| 3,221,910 | 12/1965 | Izumi | 214/309 |
| 3,289,867 | 12/1966 | Burke | 214/309 |
| 3,479,208 | 11/1969 | Dubble et al. | 427/424 |
| 3,643,823 | 2/1972 | Argyres et al. | 214/310 |
| 4,077,826 | 3/1978 | Lind | 156/350 |

*Primary Examiner*—William A. Powell
*Assistant Examiner*—Thomas Bokan
*Attorney, Agent, or Firm*—Townsend and Townsend

[57] ABSTRACT

Apparatus and method for handling glass jars with lids as they move toward a labeling machine to receive labels thereon. The jars are initially disposed in a crate which holds a number of layers of the jars and, after being unloaded from the crate, one layer at a time, the jars are moved by a conveyor along a generally horizontal path and are subjected to a hot water spray for a predetermined time. In this way, the jars are preheated so that the labels will more positively adhere thereto. Also, the spray removes dust and water spots from the lids of the jars. After passing through the spray, the jars are directed, one by one, through the labeling machine.

1 Claim, 3 Drawing Figures

FIG_1

APPARATUS FOR HANDLING GLASS JARS

This is a continuation of application Ser. No. 589,159, filed June 23, 1975, now U.S. Pat. No. 4,077,826 which is a continuation of application Ser. No. 166,885, filed July 28, 1971 now abandoned.

This invention relates to improvements in the handling of glass jars and, more particularly, to unloading of glass jars from conventional retort crates and moving the jars toward a labeling machine.

While the present invention is suitable for use with different types of glass jars to be labeled, it is especially suitable for use with glass jars filled with baby food closed with metallic caps or lids. Certain baby foods have to be subjected to heat in retorts for predetermined periods of time after the food has been put in glass jars and covered so that the food will be properly conditioned for human consumption. For placement in the retorts, the jars are first put into retort crates in stacked layers and then positioned in the retorts for the requisite time. After such time has elapsed, the crates are removed from the retorts and are unloaded, one layer at a time, and moved toward and through a labeling machine after which the jars are then packaged in shipping containers.

Means for unloading a retort crate has been previously described in U.S. Patent Application, Ser. No. 846,838, filed Aug. 1, 1969, now U.S. Pat. No. 3,643,823 and entitled "Machine for Unloading Retort Crates". With such unloading means, the layers of jars are removed from the crate, one layer at a time, by a shiftable, U-shaped bail which sweeps the uppermost layer of jars laterally onto a horizontal conveyor which advances the jars toward and through a labeling machine. An elevating mechanism incrementally raises each layer of jars after a previous layer has been swept laterally by the bale.

It has been found that oftentimes the jars remain in the retort crates for extended periods of time, such as overnight or at least long enough to cool to room temperature. During this time, dust and water spots accumulate on the caps of the jars, leaving an unsightly appearance. It has also been found that labels oftentimes do not properly adhere to the jars when they are at room temperature or have cooled after being removed from a retort. Jars with faulty labels must, therefore, be removed from a packaging line before being put into shipping containers, thus, necessitating movement of such jars back through the labeling machine.

It has been found that labels adhere to much greater extent to the jars if they are in a heated condition as they pass through the labeling machine. Thus, the present invention is directed to apparatus and method for heating a plurality of jars as they move from a retort crate unloader to a labelling machine so that the jars will be at an elevated temperature as they pass through the labelling machine. Specifically, the manner of heating includes spraying hot water on the jars to heat the same and also to remove dust and water spots from their caps. To this end, the apparatus of the invention includes an enclosure having a number of water spray nozzles coupled with a source of hot water, whereby the hot water issuing from the nozzles sprays the jars as they move toward the labeling machine.

The primary object of this invention, therefore, is to provide an apparatus and a method for heating a plurality of glass jars as they are disposed along a path between a retort crate unloader and a labeling machine so that the jars will be heated before they reach the labeling machine and they will be at the proper temperature to assure that labels applied thereto by the operation of the machine will positively adhere thereto.

A further object of this invention is to provide apparatus and a method of the type described wherein the jars are heated by spraying hot water thereon so that, not only will the jars be in condition to receive labels, as described above, but also dust and water spots on the closure caps of the jars will be removed by the spray to thereby assure that the jars will have a marketable appearance before they are packaged.

Other objects of this invention will become apparent as the following specification progresses, reference being made to the accompanying drawing for an illustration of the apparatus of the invention.

Figure 1:
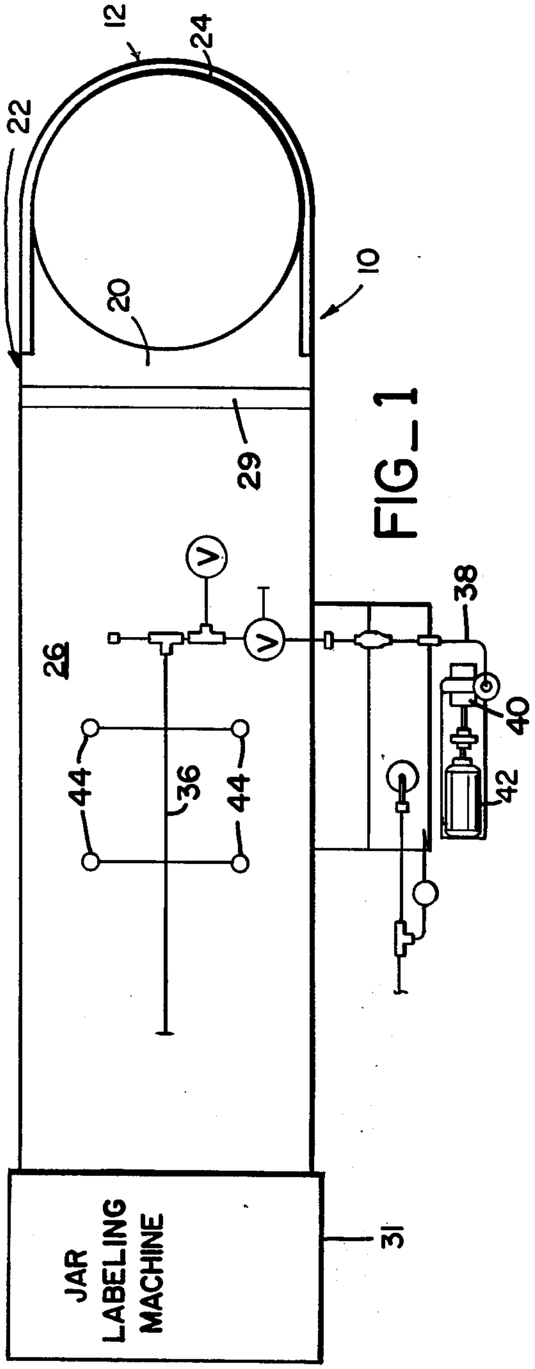
FIG. 1 is a top plan view, in schematic form of a retort crate unloader and a jar labeling machine utilizing the teachings of the present invention.

The jar handling apparatus of this invention is broadly denoted by the numeral 10 and includes a retort crate unloading apparatus 12 of the type usable with a retort crate 14 having a cylindrical side wall 15 and a vertically shiftable bottom 17. Crate 14 is adapted to receive and carry a plurality of stacked layers of closed glass jars with the layers being separated by perforate divider panels. Apparatus 12 and crate 14 are similar to or can be substantially the same as the retort crate unloading apparatus and retort crate, respectively, disclosed in U.S. Pat. Application, Ser. No. 846,838, filed Aug. 1, 1969, entitled "Machine for Unloading Retort Crates".

Crate 14 is adapted to be unloaded by apparatus 12 by positioning the crate so that the uppermost layer of jars is swept off the stack in the crate and onto a horizontal surface 20 by the horizontal movement of a U-shaped bail 24 forming a part of apparatus 12. The stack of jars in crate 14 are elevated incrementally after each layer of jars has been swept off the stack by bail 24 and after the bail has been retracted to its starting position; thus, the next uppermost layer is moved into a position so that the jars thereof may be swept onto surface 20 by bail 24.

The structure for elevating the stack includes a fluid piston and cylinder assembly 18 having a piston rod 16 coupled to bottom 17 for moving the same incrementally upwardly. Assembly 18 is mounted in a vertical position with respect to a supporting surface, such as a floor or the like and crate 14 is moved in any suitable manner, such as on a cart or dolly, into a position at which piston rod 16 can engage and elevate bottom 17 and thereby the stack of jars thereon. The jars are closed by metal or plastic lids or caps which ordinarily tend to gather dust and to retain water spots thereon.

Surface 20 forms the upper portion of a table 22 with which apparatus 12 is associated. A flowthrough wire chain conveyor 26 is horizontally mounted on a support 28 adjacent to table 22 with the conveyor being horizontally aligned with surface 20. A dead plate 29 can be used to define the junction between surface 20 and the upper stretch of conveyor 26. The jars, as they move off surface 20 under the influence of bail 24, move onto conveyor 26 and are moved to the left toward and through a conventional jar labeling machine 31. Such a machine may be of the type manufactured and sold by Standard-Knapp Division of Emhart Corporation, 125 Main Street, Portland, Connecticut.

As the jars move under the influence of conveyor 26, they pass into an enclosure 30 which includes a hood 32 having a pair of opposed sides 34 and 35 and front and rear walls 37 and 39, hood 32 being removed in FIG. 1 for purposes of clarity only. Front and rear walls 37 and 39 have openings at their lowermost margins to permit the jars on conveyor 26 to pass through the hood.

The purpose of enclosure 30 is to provide a closed space in which a hot water spray is directed downwardly and onto the jars and the caps thereof to heat the jars and to remove dust and water spots from the caps. The reason the jars are to be heated is to condition them properly to receive labels as they pass through machine 31. Labels do not always adhere to the outer surfaces of the jars when the jars are relatively cool or are at room temperature. By heating the jars immediately before they move into and through machine 31, it has been found that the labels adhere to a much greater extent to the jars and much fewer jars have to be removed from a packaging line because of faulty labels.

The hot water spray also serves to clean the dust and water spots off the caps. Dust accumulates on the caps when the jars are kept in retort crates for any extended period of time, such as overnight. Water spots appear on the caps when water evaporates after the crates have been removed from retorts. Water from the spray evaporates from the caps before water spots can form thereon.

The means for directing a hot water spray downwardly and onto the glass jars as they move under the influence conveyor 26 includes a distributor pipe 36 which is generally horizontally disposed within enclosure 30 and has one closed end and the other end coupled to a supply pipe 38 which in turn is coupled to a pump 40 operated by a drive motor 42 at one side of table 22. The distributor pipe has a number of fluid nozzles 44 which operate to provide a conical spray downwardly and onto the glass jars, the spray of one nozzle overlapping that of the next adjacent nozzle so that the area beneath the nozzles is effectively covered. While only four nozzles have been shown in FIG. 1, it is clear that additional nozzles can be provided, if desired. Moreover, the nozzles can be arranged in any desired pattern, so long as the water spray issuing therefrom will adequately contact the jars and heat the same as they move through enclosure 30 under the influence of conveyor 26.

Supply pipe 38 may be provided with a number of different components. For instance, it may have a pressure gage 46, a globe valve 48, a thermometer 50, (the water temperature generally being about 205° Farenheit), a steam injection heater 52 (providing additional heat to the water although the water is supplied to a supply tank 54 in a heated condition from a water source from a source pipe 56) and a strainer 58. Tank 54 has a float-operated valve 60 having a float 62 to limit the addition of hot water to tank 54, the hot water source coupled with pipe 56.

The water sprayed downwardly onto the glass jars passes through conveyor 26 since the latter is perforate and this water is again redirected into the tank 54 where it is recirculated by pump 40 back to nozzles 44. The water, while it might cool as it contacts the conveyor, is reheated by steam injected into hot water flowing through pipe 38. The steam issues from a source (not shown) through a pipe 53 and is controlled by a pneumatic valve 55, the air supply to valve 55 being controlled by a thermostat 57 coupled to an air supply line 59. A safety valve 61 closes line 59 when pump 40 is deactuated.

Figure 2:
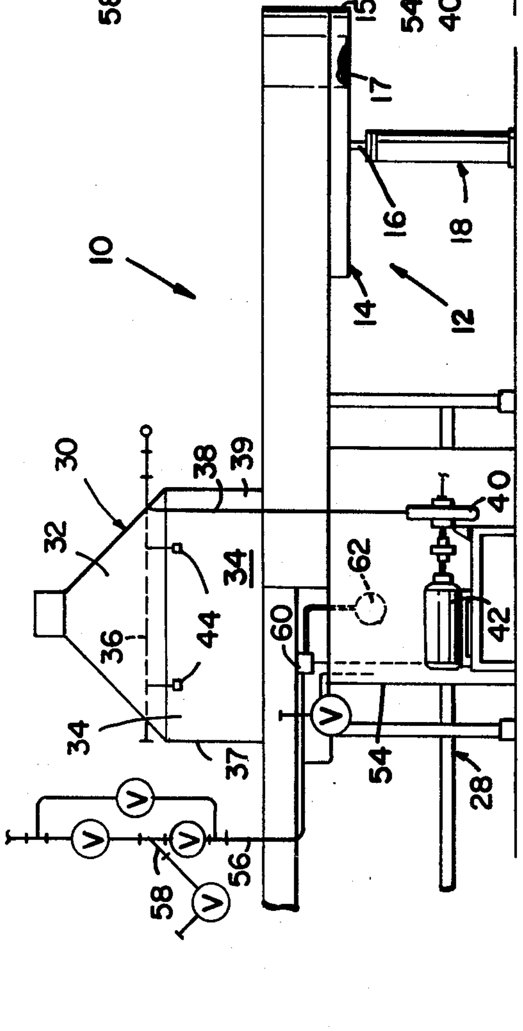
FIG. 2 is a fragmentary, schematic side elevational view of the structure of FIG. 1.
Figure 3:
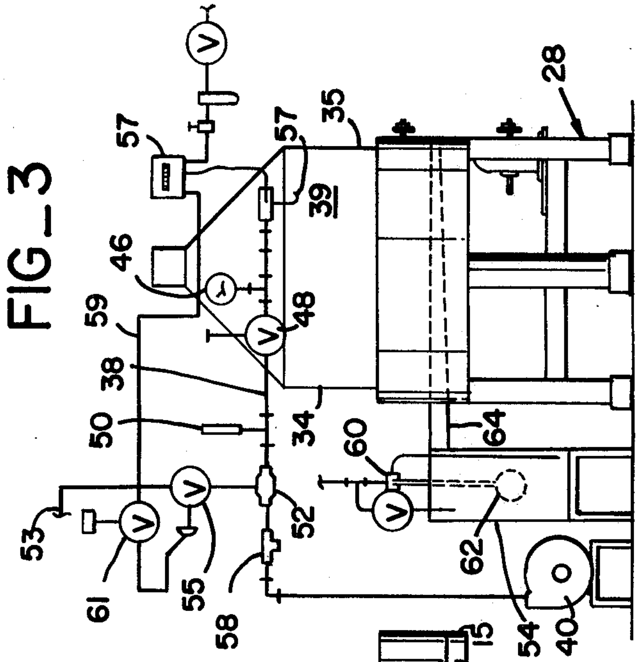
FIG. 3 is a fragmentary, schematic end elevational view of the structure of FIGS. 1 and 2.

In operation, a crate 14 containing a stack of glass jars with caps thereon is placed in apparatus 12 and water pump 40 is put into operation to commence the spray. The topmost layer of jars is then swept onto surface 20 and then conveyor 26 by the movement of bail 24 to the left when viewing FIGS. 1 and 2. The movement of the bail is under the control of the operator of the apparatus. As the jars move into enclosure 30, the water spray is directed on the jars and heats the same as well as cleans the dust and water spots from the caps. The jars continue to move under the influence of conveyor 26 out of the same and to labeling machine 31 at which the jars pass through the machine and receive labels therefrom as the jars remain in heated conditions. After the labels have been applied, the jars are then moved to a location at which they are put into boxes and packaged for shipment or storage.

Water gravitating through conveyor 26 is received by a trough 64 and returned to tank 54. The water is recirculated and replenished as needed.

I claim:

1. In an apparatus for processing externally soiled, cooled, filled glass jars of the type having a closure cap, said jars having been stored during cooling in stacked layers, the apparatus including an unloading station, a jar labeling station, a conveyor belt extending between the unloading station and the labeling station, means for moving said conveyor belt at a predetermined speed; means located at the unloading station for transferring successive layers of said jars to said conveyor belt so as to provide a continuous supply of said jars thereto; means located at said jar labeling station for applying labels to the surface of said jars, the improvement comprising:

a jar heating and cleaning station positioned along the path of said conveyor belt closely adjacent said jar labeling station, said heating and cleaning station including means to heat a cleaning fluid to substantially 200° F., a quantity of said fluid, an array of downwardly projecting spray nozzles operative to disperse an overlapping continuous spray of said heated cleaning fluid onto said caps and jars during continuous movement thereof along said conveyor belt for simultaneously cleaning the surfaces of said caps and said jars and heating said jars substantially above the room temperature, such that said jar labeling station receives said jars in a heated and cleaned state for securing labels thereto, means for circulating cleaning fluid from said heating means to said spray nozzles, and sufficient of said cleaning fluid to provide said continuous overlapping spray.

* * * * *